US011495242B2

(12) United States Patent
Chi et al.

(10) Patent No.: US 11,495,242 B2
(45) Date of Patent: Nov. 8, 2022

(54) AUDIO PROCESSING METHOD, AUDIO PROCESSING DEVICE, AND ASSOCIATED NON-TRANSITORY COMPUTER-READABLE MEDIUM

(71) Applicant: Realtek Semiconductor Corp., HsinChu (TW)

(72) Inventors: Tai-Shih Chi, Taipei (TW); Ya-Ching Lai, New Taipei (TW); Yih-Liang Shen, Changhua County (TW); Yen-Hsun Chu, HsinChu (TW); Chia-Chun Cheng, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 25 days.

(21) Appl. No.: 17/330,373

(22) Filed: May 25, 2021

(65) Prior Publication Data
US 2022/0238128 A1  Jul. 28, 2022

(30) Foreign Application Priority Data

Jan. 25, 2021 (TW) ................................ 110102634

(51) Int. Cl.
| | |
|---|---|
| *G10L 21/028* | (2013.01) |
| *G10L 25/30* | (2013.01) |
| *G06N 3/04* | (2006.01) |
| *G06N 3/08* | (2006.01) |
| *G10L 25/51* | (2013.01) |
| *G10L 25/81* | (2013.01) |

(52) U.S. Cl.
CPC .............. *G10L 21/028* (2013.01); *G06N 3/04* (2013.01); *G06N 3/08* (2013.01); *G10L 25/30* (2013.01); *G10L 25/51* (2013.01); *G10L 25/81* (2013.01)

(58) Field of Classification Search
CPC ..................................................... G10L 21/028
See application file for complete search history.

(56) References Cited

U.S. PATENT DOCUMENTS 10,224,058 B2 * 3/2019 Variani ................... G10L 25/30

OTHER PUBLICATIONS

Yi Luo, Nima Mesgarani, "Conv-TasNet: Surpassing Ideal Time-Frequency Magnitude Masking for Speech Separation", TASLP 2019, IEEE, USA.

* cited by examiner

*Primary Examiner* — Olisa Anwah
(74) *Attorney, Agent, or Firm* — Winston Hsu (57) ABSTRACT

The audio processing method may include: utilizing a first convolution layer circuit and a second convolution layer circuit to perform convolution processing on an audio mixture signal, respectively, in order to generate an input feature map; performing separation processing corresponding to a predetermined neural network model on the input feature map to obtain a first output feature map and a second output feature map respectively corresponding to a first type and a second type; and utilizing a first deconvolution layer circuit and a second deconvolution layer circuit to perform deconvolution processing on different portions of the first output feature map, respectively, and utilizing the first deconvolution layer circuit and the second deconvolution layer circuit to perform deconvolution processing on different portions of the second output feature map, respectively, in order to generate corresponding processing results, for generating multiple audio output signals.

10 Claims, 7 Drawing Sheets

AUDIO PROCESSING METHOD, AUDIO PROCESSING DEVICE, AND ASSOCIATED NON-TRANSITORY COMPUTER-READABLE MEDIUM

BACKGROUND OF THE INVENTION

1. Field of the Invention

The present invention is related to signal processing, and more particularly, to an audio processing method and an audio processing device, such as a multi-length convolution/deconvolution layer based audio processing method and device, and a non-transitory computer-readable medium thereof.

2. Description of the Prior Art

Audio separation aims to separate the audio mixture signal and extract the part that we are interested in. It can be applicable to many different fields, such as earphones, loudspeakers, and television (TV) industries, to improve user experience. For example, singing voice separation can separate the audio mixture signal into human voice and background music. The clean human voice can be used for singer recognition, automatic lyrics transcriptions, pitch tracking, vocal enhancement effect, etc. The separated background music may also be an asset for entertainment. Therefore, a novel method and related architecture are required to realize reliable audio separation processing without introducing side effects or in a way that is less likely to cause side effects.

SUMMARY OF THE INVENTION

It is an objective of the present invention to provide an audio processing method and audio processing devices, such as a multi-length-convolution/deconvolution-layer-based audio processing method and device, and a non-transitory computer-readable medium, to solve above-mentioned problems.

It is another objective of the present invention to provide an audio processing method and an audio processing device, such as a multi-length convolution/deconvolution layer based audio processing method and device, and a non-transitory computer-readable medium, to improve overall performance for a neural network architecture of the audio processing.

At least one embodiment of the present invention provides an audio processing method, wherein the method can be applicable to an electronic device with an audio processing function (e.g. TV, audio and video system). The method may include: utilizing a first convolution layer circuit and a second convolution layer circuit to perform convolution processing on an audio mixture signal, respectively, in order to generate an input feature map, wherein each of the first convolution layer circuit and the second convolution layer circuit includes multi-layer one-dimensional (1D) convolution kernels, and a convolution kernel layer length of the first convolution layer circuit and a convolution kernel layer length of the second convolution layer circuit are equal to a first length and a second length, respectively; performing separation processing corresponding to a predetermined neural network model on the input feature map, to obtain a first output feature map and a second output feature map respectively corresponding to a first type and a second type; and utilizing a first deconvolution layer circuit and a second deconvolution layer circuit to perform deconvolution processing on different portions of the first output feature map, respectively, in order to generate corresponding processing results, for generating a first audio output signal, and utilizing the first deconvolution layer circuit and the second deconvolution layer circuit to perform deconvolution processing on different portions of the second output feature map, respectively, in order to generate corresponding processing results, for generating a second audio output signal, wherein each of the first deconvolution layer circuit and the second deconvolution layer circuit includes multi-layer one-dimensional convolution kernels, and a convolution kernel layer length of the first deconvolution layer circuit and a convolution kernel layer length of the second deconvolution layer circuit are equal to the first length and the second length, respectively.

At least one embodiment of the present invention provides and audio processing device. The audio processing device may include: an audio signal analyzer, wherein the audio signal analyzer includes a first convolution layer circuit and a second convolution layer circuit; a separator, coupled to the audio signal analyzer; and an audio signal synthesizer, coupled to the separator, wherein the audio signal synthesizer includes a first deconvolution layer circuit and a second deconvolution layer circuit. The first convolution layer circuit and the second convolution layer circuit may be arranged to perform convolution processing on an audio mixture signal, respectively, in order to generate an input feature map, wherein each of the first convolution layer circuit and the second convolution layer circuit includes multi-layer one-dimensional convolution kernels, and a convolution kernel layer length of the first convolution layer circuit and a convolution kernel layer length of the second convolution layer circuit are equal to a first length and a second length, respectively. The separator may be arranged to perform separation processing corresponding to a predetermined neural network model on the input feature map, to obtain a first output feature map and a second output feature map respectively corresponding to a first type and a second type. The first deconvolution layer circuit and the second deconvolution layer circuit may be arranged to perform deconvolution processing on different portions of the first output feature map, respectively, in order to generate corresponding processing results, and perform deconvolution processing on different portions of the second output feature map, respectively, in order to generate corresponding processing results, for generating a second audio output signal, wherein each of the first deconvolution layer circuit and the second deconvolution layer circuit comprises multi-layer one-dimensional convolution kernels, and a convolution kernel layer length of the first deconvolution layer circuit and a convolution kernel layer length of the second deconvolution layer circuit are equal to the first length and the second length, respectively.

At least one embodiment of the present invention provides a non-transitory computer-readable medium. The non-transitory computer-readable medium stores computer-readable instruction code so that an audio processing device performs an audio processing procedure when executing the computer-readable instruction code, and the audio processing procedure comprises: utilizing a first convolution layer circuit and a second convolution layer circuit to perform convolution processing on an audio mixture signal, respectively, in order to generate an input feature map, wherein each of the first convolution layer circuit and the second convolution layer circuit includes multi-layer one-dimensional convolution kernels, and a convolution kernel layer length of the first convolution layer circuit and a convolution kernel layer length of the second convolution layer circuit are equal to a first length and a second length, respectively; performing separation processing corresponding to a predetermined neural network model on the input feature map, to obtain a first output feature map and a second output feature map respectively corresponding to a first type and a second type; and utilizing a first deconvolution layer circuit and a second deconvolution layer circuit to perform deconvolution processing on different portions of the first output feature map, respectively, in order to generate corresponding processing results, for generating a first audio output signal, and utilizing the first deconvolution layer circuit and the second deconvolution layer circuit to perform deconvolution processing on different portions of the second output feature map, respectively, in order to generate corresponding processing results, for generating a second audio output signal, wherein each of the first deconvolution layer circuit and the second deconvolution layer circuit comprises multi-layer one-dimensional convolution kernels, and a convolution kernel layer length of the first deconvolution layer circuit and a convolution kernel layer length of the second deconvolution layer circuit are equal to the first length and the second length, respectively.

The audio processing method and the audio processing device of the present invention can perform audio processing by the convolution layers with different lengths and the deconvolution layers with different lengths, to improve overall performance of the neural network architecture for the audio processing. Compared with the prior art, the audio processing method and the audio processing device of the present invention can greatly improve the sound output quality of audio separation processing.

These and other objectives of the present invention will no doubt become obvious to those of ordinary skill in the art after reading the following detailed description of the preferred embodiment that is illustrated in the various figures and drawings.

DETAILED DESCRIPTION

One or more embodiments of the present invention provide an audio processing method and an audio processing device to improve overall performance of the neural network architecture for the audio processing. Compared with the traditional audio separation method using short time Fourier transform (STFT), the time-domain neural network, such as the fully-convolutional time-domain audio separation network (Conv-TasNet), can be regarded as an end-to-end audio separation model, and can achieve better performance. The lengths of multiple one-dimensional (1D) convolution kernels in the encoder and decoder of Conv-TasNet are identical and relatively short, which means that the output content of the encoder has a higher temporal resolution, but has a lower frequency resolution. Due to the above-mentioned lower frequency resolution, multiple time-frequency regions between the harmonics of the sound cannot be properly resolved. As a result, the audio mixture signal cannot be properly separated. According to the basic architecture of Conv-TasNet, the audio processing method and the audio processing device of the present invention can perform audio processing by using convolutional layers with different lengths and deconvolution layers with different lengths, to improve overall performance of the neural network architecture for audio processing.

For the above-mentioned Conv-TasNet, please refer to the following document: Yi Luo, and Nima Mesgarani, "Conv-TasNet: Surpassing Ideal Time-Frequency Magnitude Masking for Speech Separation", *Transactions on Audio, Speech, and Language Processing* (*TASLP*) 2019, IEEE; with the above reference, the entirety of this document is incorporated into the description of the present invention to provide support for some relevant implementation details.

Figure 1:
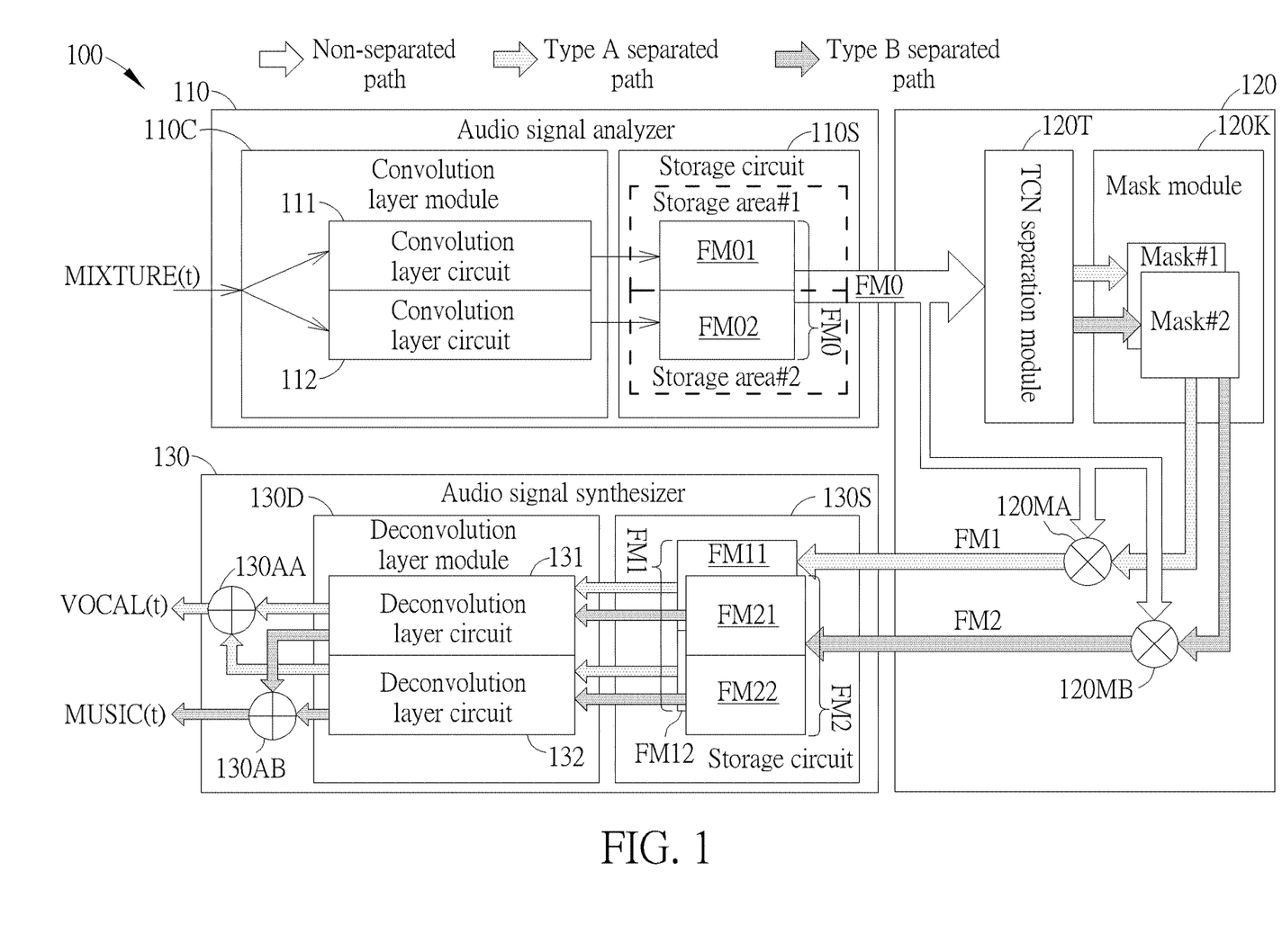
FIG. 1 is a diagram illustrating an audio processing device according to an embodiment of the present invention.

FIG. 1 is a diagram illustrating an audio processing device 100 according to an embodiment of the present invention. For better comprehension, the audio processing device 100 may represent an electronic device with an audio processing function (e.g. TV, or audio and video system), but the present invention is not limited thereto. In some embodiments, the audio processing device 100 may include at least one portion (e.g. part or all) of the electronic device. For example, the audio processing device 100 may include a portion of the electronic device, such as a control circuit of the electronic device, which can be implemented by the integrated circuit (IC). For another example, the audio processing device 100 may include specific computer-readable instruction code (e.g. software instruction code or firmware instruction code) stored in a non-transitory computer-readable medium (e.g. memory) of the electronic device, and the control circuit or other circuit with special functions of the electronic device can implement operations described in the following embodiments by executing the computer-readable instruction code. For another example, the audio processing device 100 may include the entire electronic device, such as the whole of the electronic device (e.g. electronic device including software, firmware, and hardware).

As shown in FIG. 1, the audio processing device 100 may include an audio signal analyzer 110 and an audio signal synthesizer 130, and may include a separator 120, wherein the separator 120 is coupled to the audio signal analyzer 110, and the audio signal synthesizer 130 is coupled to the separator 120. The audio signal analyzer 110 may include a convolution layer module 110C and a storage circuit 110S. The separator 120 may include a temporal convolution network (TCN) separation module 120T, a mask module 120K, and multiple multipliers 120MA and 120MB. The audio signal synthesizer 130 may include a deconvolution layer module 130D, a storage circuit 130S, and multiple adders 130AA and 130AB. In addition, the convolution layer module 110C may include convolution layer circuits 111 and 112, and each of the convolution layer circuits 111 and 112 may include multi-layer 1D convolution kernels. The respective convolution kernel lengths of the convolution layer circuits 111 and 112 are different from each other. In particular, the convolution kernel layer lengths of the convolution layer circuits 111 and 112 may be equal to a first length such as length M and a second length such as length N, respectively. In addition, the deconvolution layer module 130D may include deconvolution layer circuits 131 and 132, and each of the deconvolution layer circuits 131 and 132 may include multi-layer 1D convolution kernels. The respective convolution kernel lengths of the deconvolution layer circuits 131 and 132 are different from each other. In particular, the convolution kernel layer lengths of the deconvolution layer circuits 131 and 132 may be equal to the first length such as length M and the second length such as length N, respectively. In some embodiments, the audio signal analyzer 110 and the audio signal synthesizer 130 may be an audio signal encoder and an audio signal decoder, respectively, but the present invention is not limited thereto.

For the above-mentioned Conv-TasNet, since the implementation of convolution/deconvolution computation, TCN separation, masking processing, etc., together with the corresponding convolution/deconvolution layer computation unit, TCN separation module, mask, etc., are well known to those skilled in the Conv-TasNet field, the relevant details are omitted here. In the architecture provided by the present invention, such as the architecture shown in FIG. 1, the convolution layers with different lengths may be used to perform analysis/encoding on the audio signal and the deconvolution layers with different lengths may be used to perform synthesis/decoding on the audio signal, to improve overall performance.

According to the architecture shown in FIG. 1, the convolution layer circuits 111 and 112 may perform convolution processing on an audio mixture signal MIXTURE(t), respectively, to generate an input feature map FM0. For example, the convolution layer circuit 111 may perform convolution processing corresponding to the first length (e.g. length M) on multiple samples of the audio mixture signal MIXTURE(t), to generate a partial feature map FM01 of the input feature map FM0. The convolution layer circuit 112 may perform convolution processing corresponding to the second length (e.g. length N) on multiple samples of the audio mixture signal MIXTURE(t), to generate a partial feature map FM02 of the input feature map FM0. Multiple storage areas (e.g. storage areas #1 and #2) of the storage circuit 110S may temporarily store these partial feature maps FM01 and FM02, and the audio signal analyzer 110 may combine these partial feature maps FM01 and FM02 to generate and output the input feature map FM0 to the separator 120.

In addition, the separator 120 may perform separation processing that corresponds to a predetermined neural network model (e.g. the above-mentioned end-to-end audio separation model, such as the Conv-TasNet model), and more particularly, to the separation module therein, on the input feature map FM0 to thereby obtain output feature maps FM1 and FM2 corresponding to a first type (e.g. type A) and a second type (e.g. type B), respectively. For example, the separator 120 may use the TCN module 120T corresponding to the predetermined neural network module to perform the separation processing (e.g. the TCN separation) on the input feature map FM0, to generate masks #1 and #2 corresponding to the first type (e.g. type A) and the second type (e.g. type B), respectively, and may use the multiplier 120MA to perform multiplication computation on the input feature map FM0 and the mask #1 corresponding to the first type, to generate the output feature map FM1, and may use the multiplier 120MB to perform multiplication computation on the input feature map FM0 and the mask #2 corresponding to the second type, to generate the output feature map FM2.

In addition, the deconvolution layer circuits 131 and 132 may perform deconvolution processing on different portions of the output feature map FM1, respectively, to generate corresponding processing results, for generating a first audio output signal corresponding to the first type (e.g. type A), such as an audio output signal VOCAL(t). For example, the audio signal synthesizer 130 may receive the output feature map FM1 from the separator 120, and may use a set of storage areas of the storage circuit 130S to temporarily store the above-mentioned different portions of the output feature map FM1. More particularly, the following operations are performed:

(1) utilizing the deconvolution layer circuit 131 to perform deconvolution processing corresponding to the first length (e.g. length M) on a partial feature map FM11 of the output feature map FM1, for generating a set of first intermediate samples corresponding to the partial feature map FM11;

(2) utilizing the deconvolution layer circuit 132 to perform deconvolution processing corresponding to the second length (e.g. length N) on a partial feature map FM12 of the output feature map FM1, for generating a set of second intermediate samples corresponding to the partial feature map FM12; and (3) utilizing the adder 130AA to perform addition computation on the set of first intermediate samples corresponding to the partial feature map FM11 and the set of second intermediate samples corresponding to the partial feature map FM12, respectively, to generate a set of addition computation results as multiple samples of the first audio output signal (e.g. the audio output signal VOCAL(t)), wherein the first audio output signal (e.g. the audio output signal VOCAL(t)) may carry these multiple samples.

Similarly, the deconvolution layer circuits 131 and 132 may perform deconvolution processing on different portions of the output feature map FM2, respectively, to generate corresponding processing results, for generating a second audio output signal corresponding to the second type (e.g. type B), such as an audio output signal MUSIC(t). For example, the audio signal synthesizer 130 may receive the output feature map FM2 from the separator 120, and may use another set of storage areas of the storage circuit 130S to temporarily store the above-mentioned different portions of the output feature map FM2. More particularly, the following operations are performed:

(1) utilizing the deconvolution layer circuit 131 to perform deconvolution processing corresponding to the first length (e.g. length M) on a partial feature map FM21 of the output feature map FM2, for generating a set of first intermediate samples corresponding to the partial feature map FM21;

(2) utilizing the deconvolution layer circuit 132 to perform deconvolution processing corresponding to the second length (e.g. length N) on a partial feature map FM22 of the output feature map FM2, for generating a set of second intermediate samples corresponding to the partial feature map FM22; and (3) utilizing the adder 130AB to perform addition computation on the set of first intermediate samples corresponding to the partial feature map FM21 and the set of second intermediate samples corresponding to the partial feature map FM22, respectively, to generate a set of addition computation results as multiple samples of the second audio output signal (e.g. the audio output signal MUSIC(t)), wherein the second audio output signal (e.g. the audio output signal MUSIC (t)) may carry these multiple samples.

For better comprehension, the non-separated path, the type A separated path (e.g. the separated path corresponding to type A), and the type B separated path (e.g. the separated path corresponding to type B) are illustrated in FIG. 1, to indicate the data path of relevant data and the data flow thereon, respectively, but the present invention is not limited thereto. In addition, the "(t)" in the respective symbols of the above-mentioned signals (e.g. the audio mixture signal MIXTURE(t), the audio output signal VOCAL(t) and MUSIC(t)) may indicate that these signals are presented in form of functions of time. In some embodiments, the type A and the type B may be distinguished according to the specific frequency of the audio (e.g. the fundamental frequency of the human voice of an adult male is approximately 85-180 Hz, and the fundamental frequency of the human voice of an adult female is approximately 165-255 Hz). The type A approximately corresponds to the human voice component in the audio mixture signal MIXTURE(t) and is therefore labeled as the audio output signal VOCAL(t), and the type B approximately corresponds to the music (or background) component in the audio mixture signal MIXTURE(t) and is therefore labeled as the audio output signal MUSIC(t).

According to some embodiments, the convolution layer circuit 111 may include a set of 1D convolution layers, each having the first length (e.g. length M), for acting as the multi-layer 1D convolution kernels in the convolution layer circuit 111. The convolution layer circuit 112 may include a set of 1D convolution layers, each having the second length (e.g. length N), for acting as the multi-layer 1D convolution kernels in the convolution layer circuit 112. In addition, the deconvolution layer circuit 131 may include a set of 1D convolution layers, each having the first length (e.g. length M), for acting as the multi-layer 1D convolution kernels in the deconvolution layer circuit 131. The deconvolution layer circuit 132 may include a set of 1D convolution layers, each having the second length (e.g. length N), for acting as the multi-layer 1D convolution kernels in the deconvolution layer circuit 132.

Figure 2:
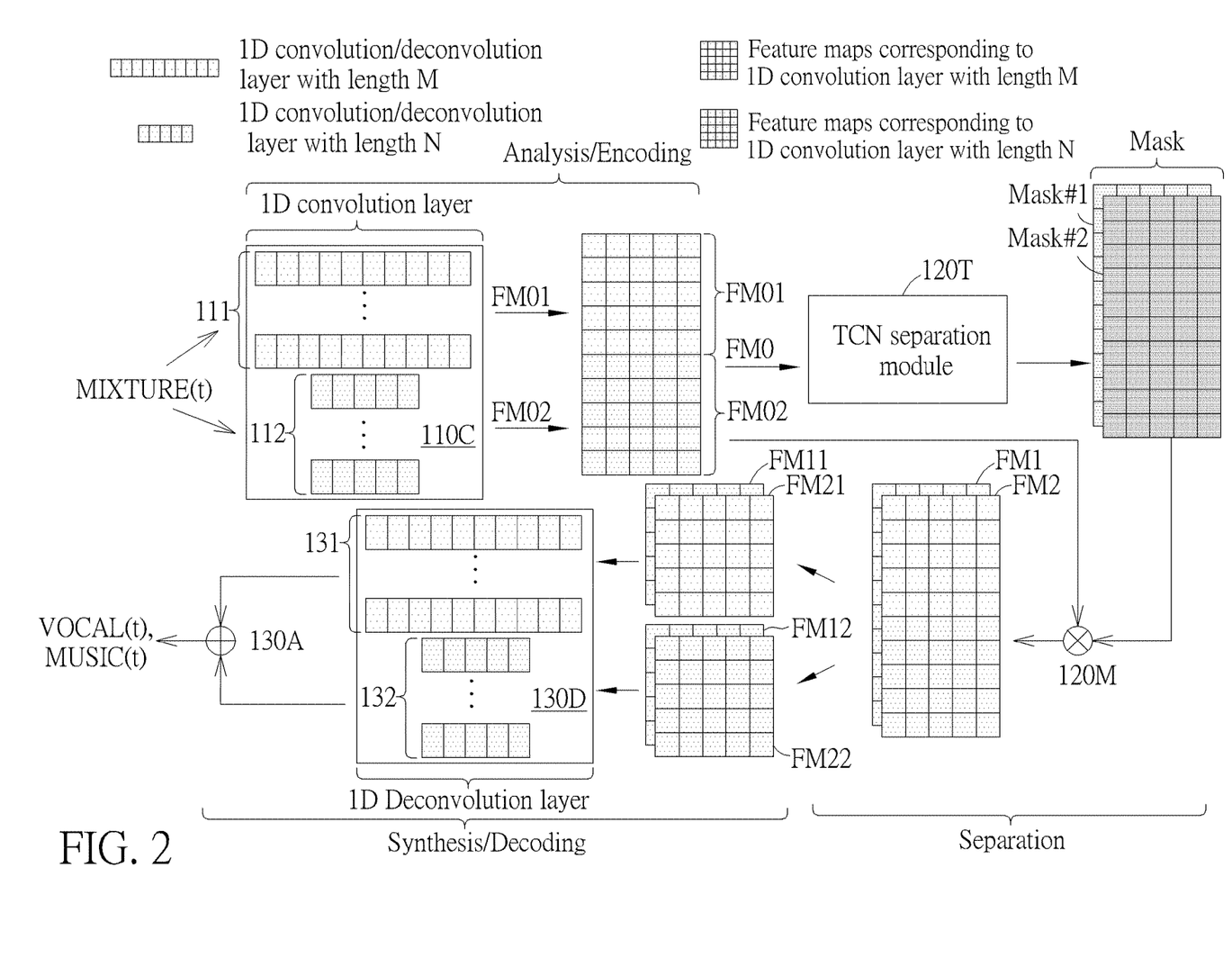
FIG. 2 is a diagram illustrating a multi-length-convolution/deconvolution-layer-based control scheme of an audio processing method according to an embodiment of the present invention.

FIG. 2 is a diagram illustrating a multi-length-convolution/deconvolution-layer-based control scheme of an audio processing method according to an embodiment of the present invention. The method may be applicable to the audio processing device 100 shown in FIG. 1, and more particularly, to the electronic device with the audio processing function (e.g. TV, or audio and video system). For example, the first length may represent length M, and the second length may represent length N. For better comprehension, the 1D convolution/deconvolution layer with length M (e.g. the set of 1D convolution layers in the convolution layer circuit 111 and the set of 1D deconvolution layers in the deconvolution layer circuit 131), the 1D convolution/deconvolution layer with length N (e.g. the set of 1D convolution layers in the convolution layer circuit 112 and the set of 1D deconvolution layers in the deconvolution layer circuit 132), the feature maps (e.g. the partial feature maps FM01, FM11, and FM21) corresponding to the 1D convolution layer with length M (e.g. the set of 1D convolution layers in the convolution layer circuit 111), and the feature maps (e.g. the partial feature map FM02, FM12, and FM22) corresponding to the 1D convolution layer with length N (e.g. the set of 1D convolution layers in the convolution layer circuit 112) are illustrated in FIG. 2, but the present invention is not limited thereto. For brevity, similar descriptions in this embodiment are not repeated in detail here.

Figure 3:
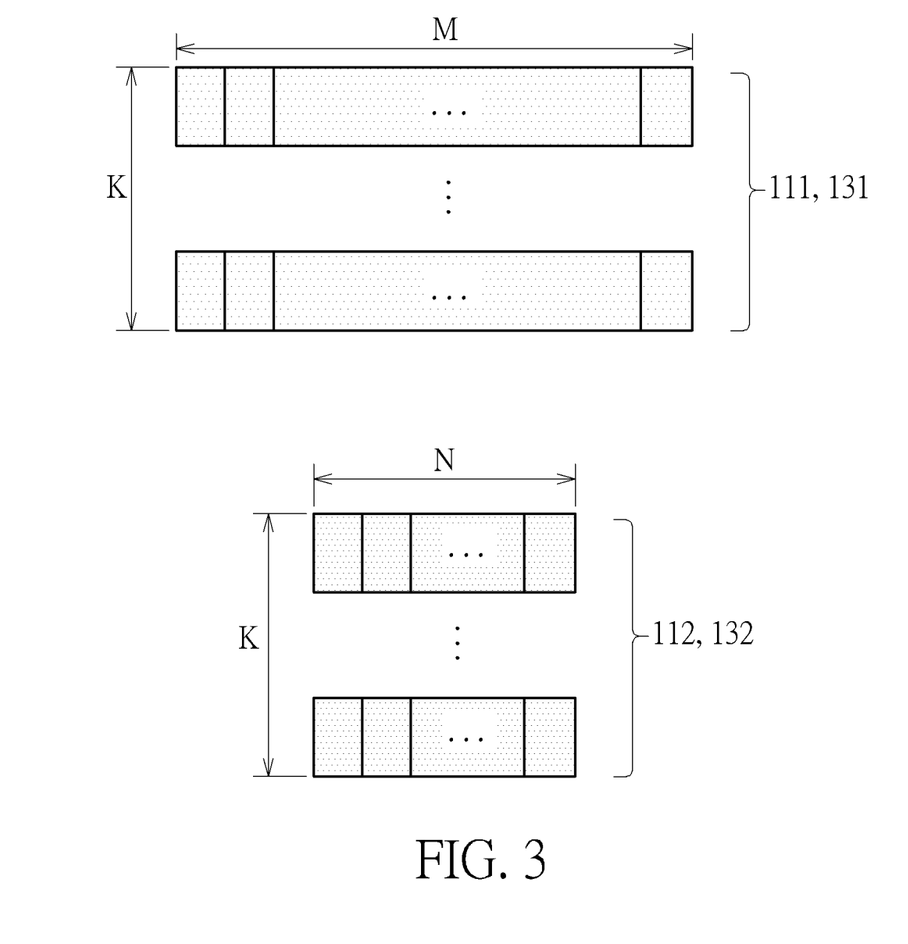
FIG. 3 illustrates an exemplary embodiment of 1D convolution/deconvolution layers involved in the audio processing method.
Figure 4:
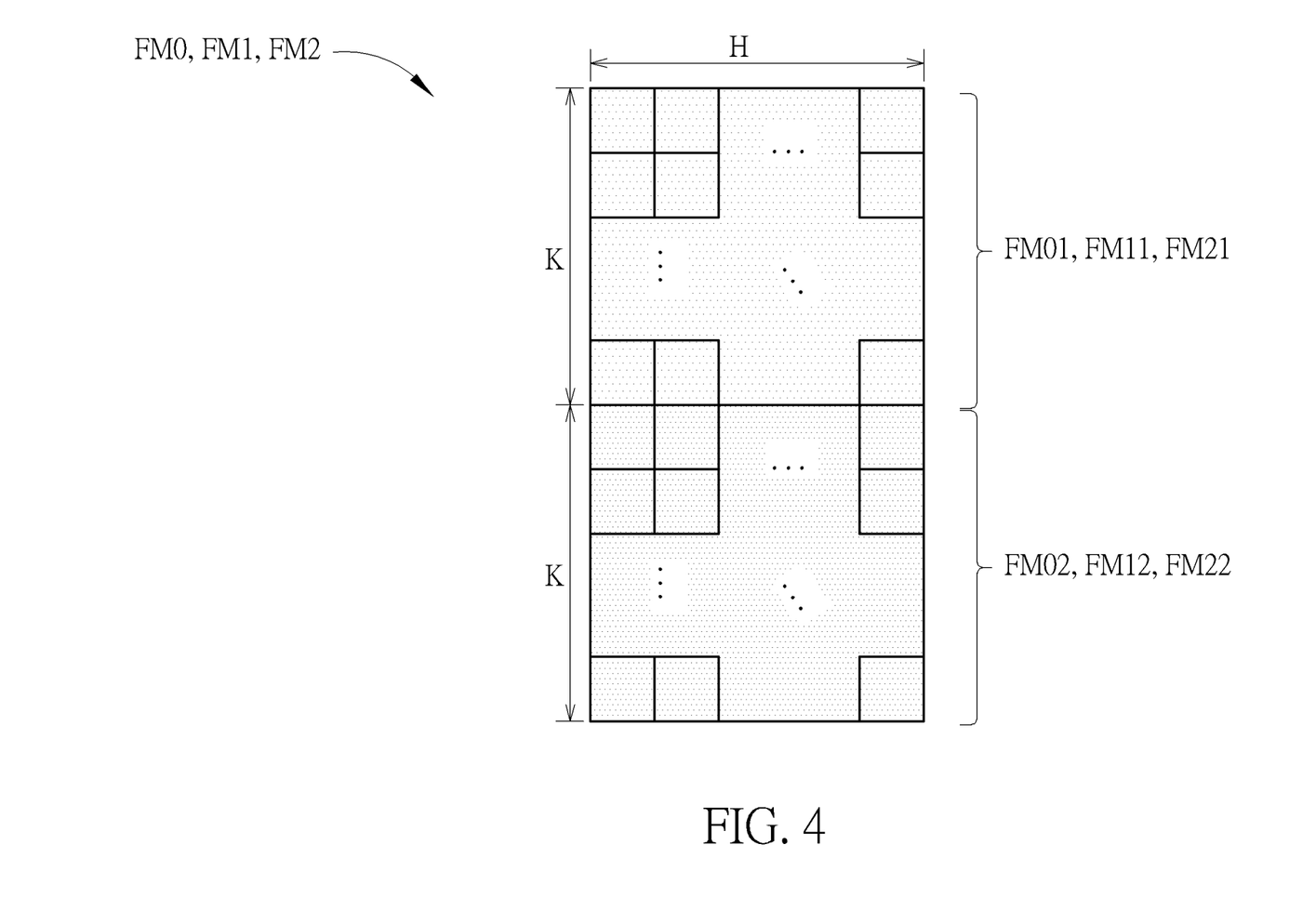
FIG. 4 illustrates an exemplary embodiment of feature maps involved in the audio processing method.
Figure 5:
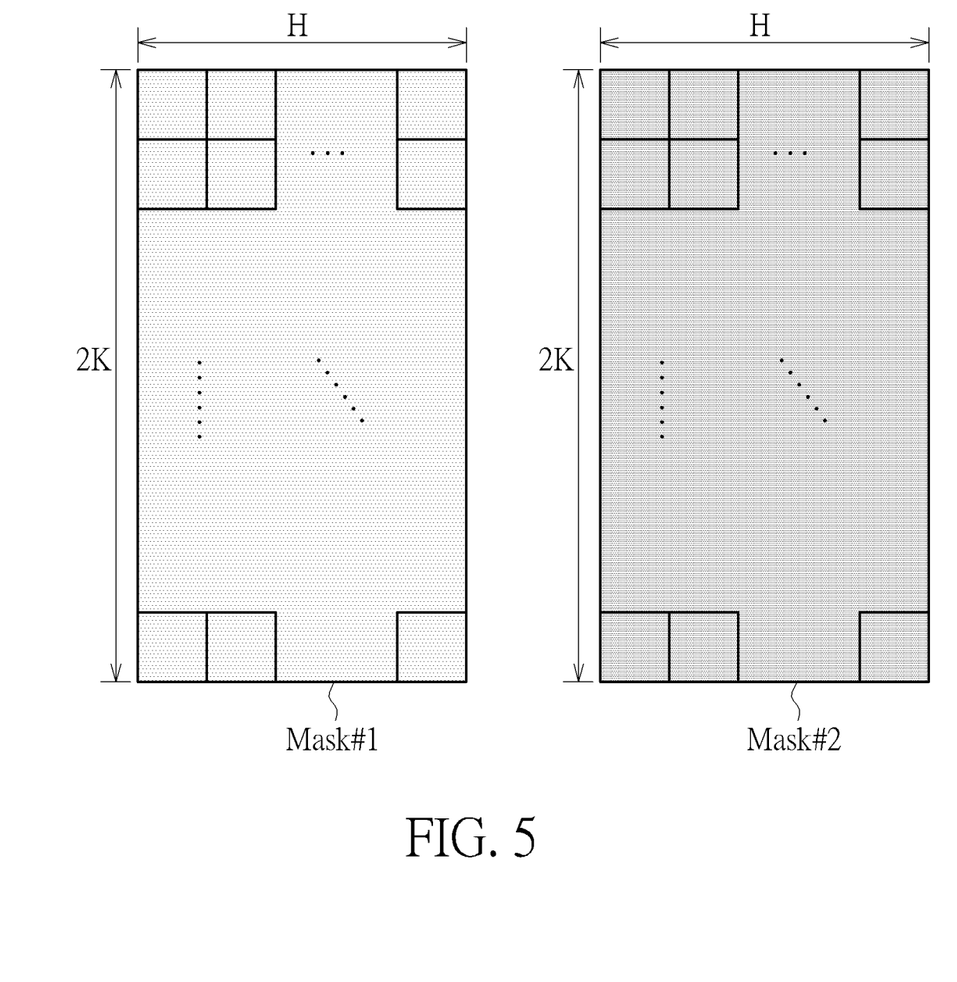
FIG. 5 illustrates an exemplary embodiment of masks involved in the audio processing method.

FIG. 3 illustrates an example of 1D convolution/deconvolution layers involved in the audio processing method. FIG. 4 illustrates an example of feature maps involved in the audio processing method. FIG. 5 illustrates an example of masks involved in the audio processing method. In FIGS. 3-5, the parameters, such as M, N, H, and K, may indicate sizes of the relevant 1D convolution/deconvolution layer, the feature map/partial feature map, and the mask. For example, any of M, N, H, and K may be a positive integer greater than one, and in some embodiments, H>M>N and H may be much greater than M and N, but the present invention is not limited thereto. As shown in FIG. 3, the length of any convolution layer in the convolution layer circuit 111 and the length of any deconvolution layer in the deconvolution layer circuit 131 are equal to length M, the length of any convolution layer in the convolution layer circuit 112 and the length of any deconvolution layer in the deconvolution layer circuit 132 are equal to length N, and the number of layers of each of the convolution layer circuits 111 and 112 and the number of layers of each of the deconvolution layer circuits 131 and 132 are equal to K. As shown in FIG. 4, the width and height of each feature map in the feature maps FM0, FM1, and FM2 are equal to H and 2K (e.g. (K+K)=2K), respectively, and the width and height of each partial feature map in the respective partial feature maps {FM01, FM02}, {FM11, FM12}, and {FM21, FM22} of the feature maps FM0, FM1, and FM2 are equal to H and K, respectively. As shown in FIG. 5, the width and height of each mask in the masks #1 and #2 are equal to H and 2K, respectively. For brevity, similar descriptions in this embodiment are not repeated in detail here.

As mentioned before, if the type A corresponds to the human voice component in the audio mixture signal MIXTURE(t) and the type B corresponds to the music component in the audio mixture signal MIXTURE(t), it means that the audio processing method of the present invention may use different convolution kernel lengths to process different frequency components (i.e. the human voice component and the music component in the above-mentioned embodiments) in the audio mixture signal MIXTURE(t), respectively, to obtain an effect superior to that of the prior art processing with the same kernel length.

According to some embodiments, H=1001, M=480 (which corresponds to the convolution kernel length of the convolution/deconvolution layer in the type A separated path), N=32 (which corresponds to the convolution kernel length of the convolution/deconvolution layer in the type B separated path), and K=256, but the present invention is not limited thereto. For brevity, similar descriptions in these embodiments are not repeated in detail here.

TABLE 1

| Kernel length (long, short) | Stride | Music SDR mean | Human voice SDR mean | Music SDRi Mean | Human voice SDRi mean |
| --- | --- | --- | --- | --- | --- |
| 480, 40 | 8 | 11.98 | 3.87 | 4.88 | 10.35 |
| 480, 32 | 8 | 12.38 | 4.64 | 5.28 | 11.12 |
| 480, 16 | 8 | 12.11 | 3.83 | 5.00 | 10.31 |

TABLE 2

| Kernel length (long, short) | Stride | Music SDR mean | Human voice SDR mean | Music SDRi Mean | Human voice SDRi mean |
| --- | --- | --- | --- | --- | --- |
| 512, 40 | 8 | 11.95 | 3.61 | 4.84 | 10.08 |
| 480, 40 | 8 | 11.98 | 3.87 | 4.88 | 10.35 |
| 256, 40 | 8 | 11.29 | 2.96 | 4.19 | 9.44 |
| 100, 40 | 8 | 11.50 | 3.01 | 4.40 | 9.49 |

TABLE 3

| Kernel length | Stride | Music SDR mean | Human voice SDR mean | Music SDRi Mean | Human voice SDRi mean |
| --- | --- | --- | --- | --- | --- |
| 40 | 8 | 11.80 | 3.65 | 4.69 | 10.13 |
| 32 | 8 | 11.98 | 3.91 | 4.88 | 10.39 |
| 16 | 8 | 12.02 | 3.45 | 4.92 | 9.93 |

Table 1 illustrates experimental results obtained by using the audio processing device 100 to process the DSD100 audio data set published on the Internet according to multiple embodiments of the present invention. Table 2 illustrates experimental results obtained by using the audio processing device 100 to process the above-mentioned DSD100 audio data set according to multiple embodiments of the present invention. Table 3 illustrates experimental results obtained by processing the above-mentioned DSD100 audio data set according to the prior art. Any set of the experimental results in each of Table 1 and Table 2 corresponds to multiple kernel lengths (for brevity, labeled as "(long, short)"), and any set of experimental results in Table 3 corresponds to a single kernel length.

TABLE 4

| Kernel length (long, short) | Stride | Music SDR mean | Human voice SDR mean | Music SDRi mean | Human voice SDRi mean |
| --- | --- | --- | --- | --- | --- |
| 480, 40 | 8 | 12.47 | 3.61 | 4.89 | 10.57 |
| 480, 32 | 8 | 12.92 | 4.45 | 5.34 | 11.41 |
| 480, 16 | 8 | 12.58 | 3.41 | 5.00 | 10.37 |

TABLE 5

| Kernel length (long, short) | Stride | Music SDR mean | Human voice SDR mean | Music SDRi mean | Human voice SDRi mean |
| --- | --- | --- | --- | --- | --- |
| 512, 40 | 8 | 12.40 | 3.31 | 4.82 | 10.28 |
| 480, 40 | 8 | 12.47 | 3.61 | 4.89 | 10.57 |
| 256, 40 | 8 | 11.43 | 2.37 | 3.85 | 9.34 |
| 100, 40 | 8 | 11.83 | 2.67 | 4.25 | 9.63 |

TABLE 6

| Kernel length | Stride | Music SDR mean | Human voice SDR mean | Music SDRi mean | Human voice SDRi mean |
| --- | --- | --- | --- | --- | --- |
| 40 | 8 | 12.30 | 3.42 | 4.72 | 10.38 |
| 32 | 8 | 12.51 | 3.68 | 4.93 | 10.64 |
| 16 | 8 | 12.57 | 3.06 | 4.99 | 10.02 |

Table 4 illustrates experimental results obtained by using the audio processing device 100 to process the MUSDB18 audio data set published on the Internet according to multiple embodiments of the present invention. Table 5 illustrates experimental results obtained by using the audio processing device 100 to process the above-mentioned MUSDB18 audio data set according to multiple embodiments of the present invention. Table 6 illustrates experimental results obtained by processing the above-mentioned MUSDB18 audio data set according to the prior art. Any set of the experimental results in each of Table 4 and Table 5 corresponds to multiple kernel lengths (for brevity, labeled as "(long, short)"), and any set of experimental results in Table 6 corresponds to a single kernel length.

The field "Stride" in Tables 1-6 records the number of steps that the convolution layer kernel moves when the convolution computation is performed in the neural network model training. Since its meaning is well-known to those skilled in this field, further description is omitted here for brevity. In addition, the subsequent fields in Tables 1-6 record respective source to distortion ratio (SDR) mean and source to distortion ratio improvement (SDRi) mean (hereinafter referred to as SDR and SDRi, respectively) of human voice and music.

Tables 1-6 indicate the difference between the experimental results obtained according to some embodiments of the present invention and the experimental results obtained according to the prior art. Tables 1-2 and Tables 4-5 illustrate the experimental results obtained by processing the specific audio data set (e.g. the audio data set processed by Tables 1-2 being the DSD100 audio data set published on the Internet, and the audio data set processed by Tables 4-5 being the MUSDB18 audio data set published on the Internet) by convolution kernel lengths of different convolution/deconvolution layers according to the audio processing device 100 of the present invention in some embodiments. Table 3 and Table 6 illustrate the experimental results obtained by processing the above-mentioned specific audio data set (e.g. the audio data set processed by Table 3 being the above-mentioned DSD100 audio data set, and the audio data set processed by Table 6 being the above-mentioned MUSDB18 audio data set) by convolution kernel lengths of identical convolution/deconvolution layers according to the prior art (traditional Conv-TasNet).

Among the various combinations shown in the experimental results, the above-mentioned condition of M=480 and N=32 is preferred. In this situation, the maximum SDR value and SDRi value may be obtained.

As shown in the experimental results, when the SDR value is larger, the separated signal is closer to the target signal, and is less interfered with other sound source signals. SDRi is an enhanced SDR, and its calculation method may include:

(1) utilizing the unseparated signal (e.g. the above-mentioned audio mixture signal MIXTURE(t)) and the target signal to perform SDR computation, to obtain a first SDR;
(2) utilizing the separated signal and the target signal to perform SDR computation, to obtain a second SDR; and
(3) according to the first SDR and the second SDR, performing subtraction computation to obtain a SDR difference value (e.g. the value obtained by subtracting the first SDR from the second SDR) as SDRi;
wherein SDRi may be arranged to represent the optimization degree of the separated signal compared to the unseparated signal.

Regardless of being in Tables 1-3 or Tables 4-6, the experimental results obtained by using the convolution kernel lengths of the different convolution/deconvolution layers to perform audio processing according to the audio processing device 100 of the present invention are superior to the experimental results obtained by using the convolution kernel lengths of the same convolution/deconvolution layers to perform audio processing according to the prior art. However, it is understood that the difference in characteristics of different data sets may affect the selected convolution kernel length, and applications of the present invention are not limited by the data set and the convolution kernel length used to obtain the experimental results. Generally speaking, when an unseparated signal includes more complex musical instrument component, processing this unseparated signal by the device/method of the present invention may lead to better results.

Figure 6:
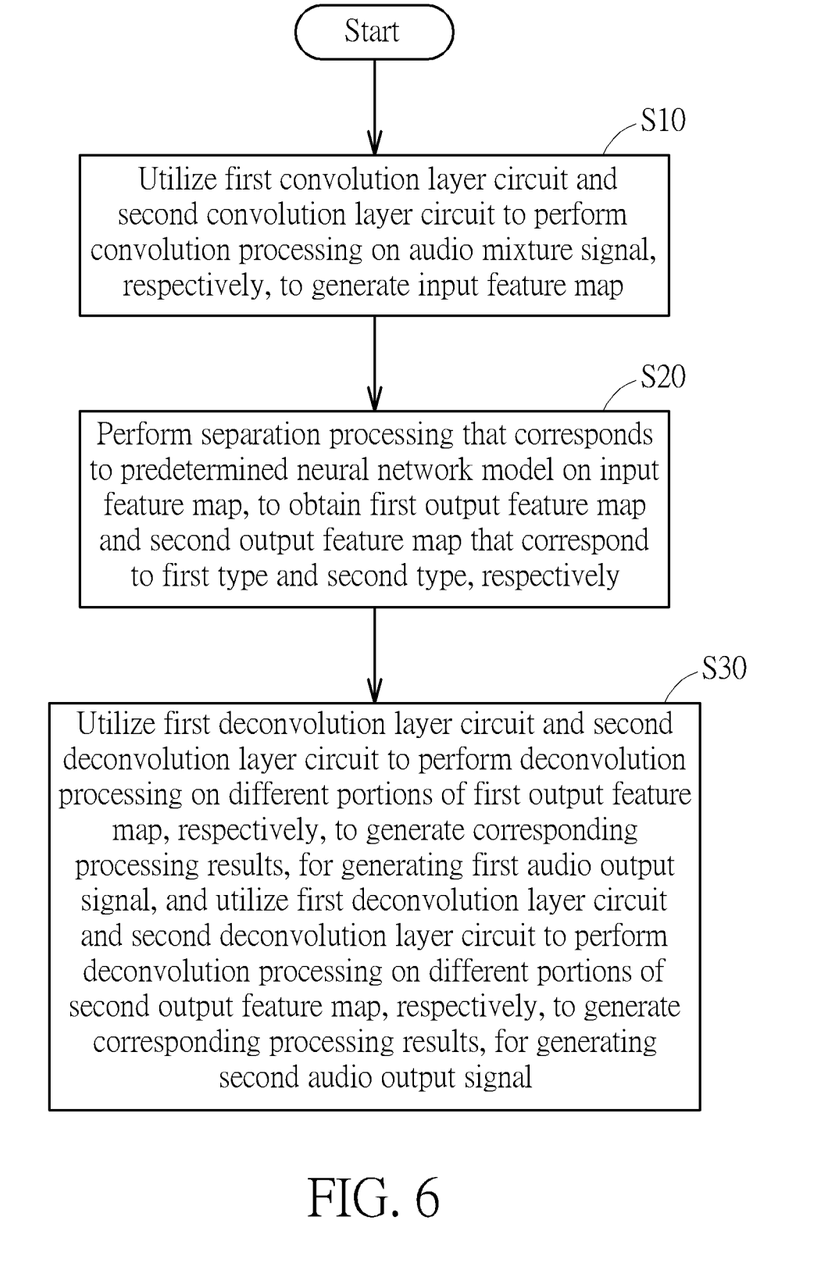
FIG. 6 illustrates a flowchart of the audio processing method according to an embodiment of the present invention.

FIG. 6 illustrates a flowchart of the audio processing method according to an embodiment of the present invention.

In Step S10, the audio processing device 100 may utilize the convolution layer circuits 111 and 112 to perform convolution processing on the audio mixture signal MIXTURE(t), respectively, to generate the input feature map FM0.

In Step S20, the audio processing device 100 may utilize the separator 120 to perform separation processing corresponding to the predetermined neural network model on the input feature map FM0, to obtain the output feature maps FM1 and FM2 corresponding to the first type (e.g. type A) and the second type (e.g. type B), respectively.

In Step S30, the audio processing device 100 may utilize the deconvolution layer circuits 131 and 132 to perform deconvolution processing on different portions of the output feature map FM1, respectively, in order to generate corresponding processing results, for generating the first audio output signal corresponding to the first type (e.g. type A), such as the audio output signal VOCAL(t), and may utilize the deconvolution layer circuits 131 and 132 to perform deconvolution processing on different portions of the output feature map FM2, respectively, in order to generate corresponding processing results, for generating the second audio output signal corresponding to the second type (e.g. type B), such as the audio output signal MUSIC(t).

For brevity, similar descriptions in this embodiment are not repeated in detail here.

For better comprehension, the audio processing method may be illustrated by the working flow shown in FIG. 6, but the present invention is not limited thereto. According to some embodiments, one or more steps may be added, deleted, or changed in the working flow shown in FIG. 6.

According to some embodiments, the audio processing method may further include executing a training procedure, wherein the training procedure includes: according to the predetermined input audio signal, the predetermined audio output signal corresponding to type A, and the predetermined audio output signal corresponding to type B, performing training on this model to train parameters of this model; and achieving completion of the training by performing the training multiple times to obtain final values of the parameters of this model that is later used by the above-mentioned audio signal processing.

Figure 7:
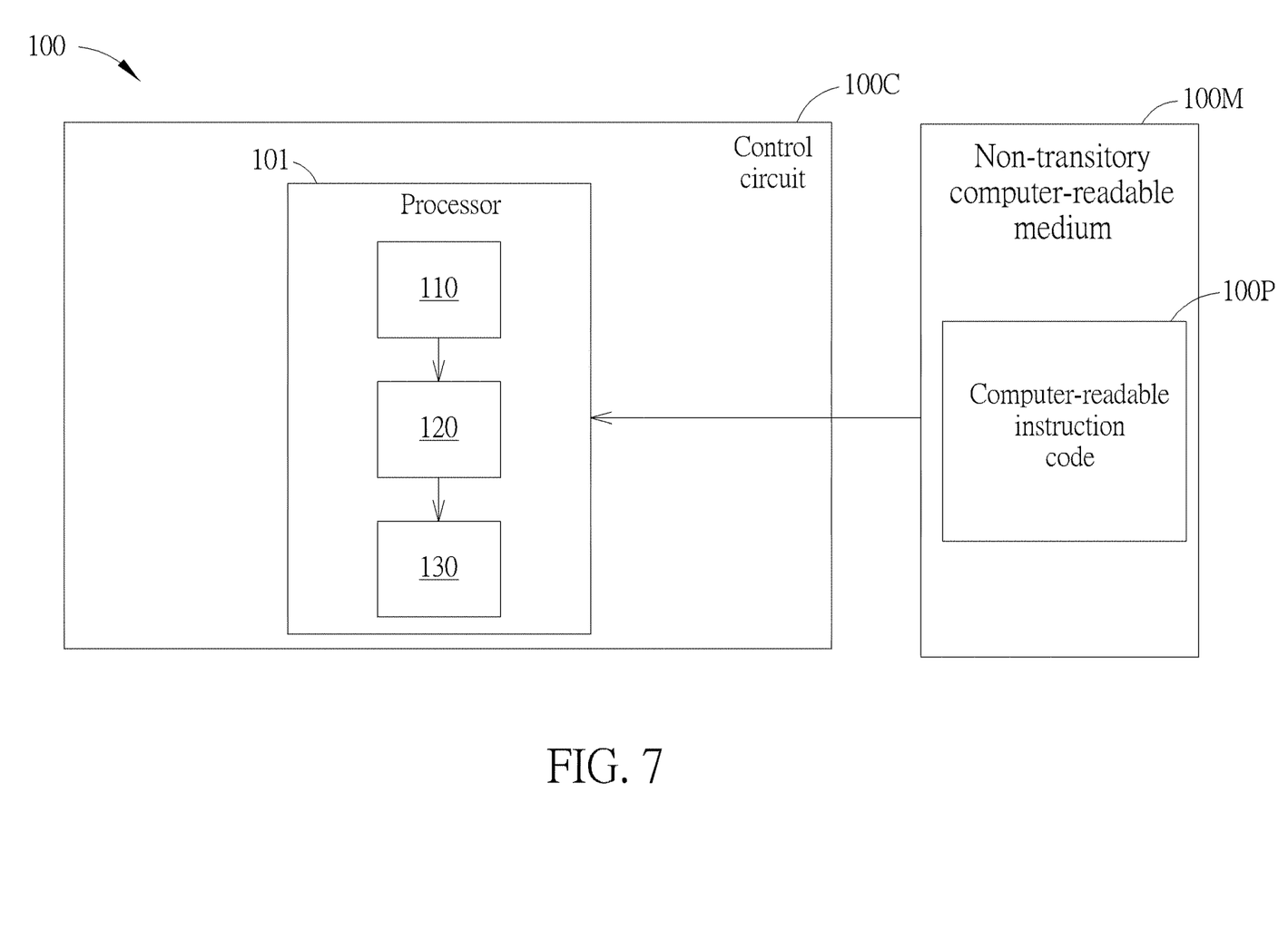
FIG. 7 illustrates a non-transitory computer-readable medium involved in the audio processing method according to an embodiment of the present invention.

FIG. 7 illustrates a non-transitory computer-readable medium 100M involved in the audio processing method according to an embodiment of the present invention, wherein the non-transitory computer-readable medium 100M stores computer-readable instruction code 100P so that the audio processing device 100 (e.g. the control circuit of the electronic device, such as the control circuit 100C of this embodiment, and more particularly, the processor 101 therein) performs an audio processing procedure (e.g. the above-mentioned audio processing, such as various operations mentioned in the above embodiments) when executing the above-mentioned computer-readable instruction code 100P. The processor 101 may represent at least one processor (e.g. one or more processors) in the control circuit 100C. For better comprehension, the processor 101 (e.g. multiple partial circuits of the processor 101, such as multiple sub-circuits of a single processor, multiple processor cores of a single processor, or multiple processors/processor cores) running the above-mentioned computer-readable instruction code 100P may be configured as the architecture shown in FIG. 1 (e.g. the audio signal analyzer 110, the separator 120, and the audio signal synthesizer 130, which are only labeled with symbolizations in FIG. 7). The non-transitory computer-readable medium 100M may represent a certain storage device/component, which may be implemented by a hard disk drive (HDD), a solid state drive (SSD), a universal flash storage (UFS) device, a non-volatile memory element (e.g. electrically-erasable programmable read-only memory (EEPROM)), a flash memory, etc., but the present invention is not limited thereto. For brevity, similar descriptions in this embodiment are not repeated in detail here.

According to some embodiments, the above-mentioned audio signal analyzer 110, separator 120, and audio signal synthesizer 130 may be implemented by a processing circuit (e.g. the processor 101) running the software, and intermediate data generated by the processing circuit running the software may be stored/temporarily stored by utilizing the memory of the electronic device. For example, under the situation that the control circuit of the electronic device (e.g. TV) is implemented as an integrated circuit (IC) such as a TV IC, the memory may be located on the IC.

The multi-frequency-resolution architecture (referred to as MF architecture) of the present invention, such as the architectures shown in FIGS. 1 and 2, may apply two types of the 1D convolution kernels respectively having different lengths to a neural network model, to simultaneously provide the contents of different frequency resolutions (e.g. the above-mentioned human voice component and music component), and more particularly, to make the convolution kernels in the corresponding MF model (e.g. the neural network model having the MF architecture) able to act as band-pass filters having different frequency resolutions and learn to use different resolution kernels to analyze signals of different frequencies, wherein this phenomenon is consistent with the function of the human cochlear. As a result, the audio processing method and the audio processing device of the present invention may greatly improve the sound output quality of audio separation processing.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An audio processing method, applicable to an electronic device with an audio processing function, comprising:
utilizing a first convolution layer circuit and a second convolution layer circuit to perform convolution processing on an audio mixture signal, respectively, in order to generate an input feature map, wherein each of the first convolution layer circuit and the second convolution layer circuit comprises multi-layer one-dimensional convolution kernels, and a convolution kernel layer length of the first convolution layer circuit and a convolution kernel layer length of the second convolution layer circuit are equal to a first length and a second length, respectively;

performing separation processing corresponding to a predetermined neural network model on the input feature map, to obtain a first output feature map and a second output feature map respectively corresponding to a first type and a second type; and utilizing a first deconvolution layer circuit and a second deconvolution layer circuit to perform deconvolution processing on different portions of the first output feature map, respectively, in order to generate corresponding processing results, for generating a first audio output signal, and utilizing the first deconvolution layer circuit and the second deconvolution layer circuit to perform deconvolution processing on different portions of the second output feature map, respectively, in order to generate corresponding processing results, for generating a second audio output signal, wherein each of the first deconvolution layer circuit and the second deconvolution layer circuit comprises multi-layer one-dimensional convolution kernels, and a convolution kernel layer length of the first deconvolution layer circuit and a convolution kernel layer length of the second deconvolution layer circuit are equal to the first length and the second length, respectively.

2. The audio processing method of claim 1, wherein utilizing the first convolution layer circuit and the second convolution layer circuit to perform convolution processing on the audio mixture signal, respectively, further comprises:

utilizing the first convolution layer circuit to perform convolution processing corresponding to the first length on multiple samples of the audio mixture signal, to generate a first partial feature map of the input feature map; and utilizing the second convolution layer circuit to perform convolution processing corresponding to the second length on the multiple samples of the audio mixture signal, to generate a second partial feature map of the input feature map.

3. The audio processing method of claim 1, wherein performing the separation processing corresponding to the predetermined neural network model on the input feature map to obtain the first output feature map and the second output feature map respectively corresponding to the first type and the second type further comprises:

utilizing a temporal convolution network module corresponding to the predetermined neural network model to perform the separation processing on the input feature map, for generating a first mask and a second mask corresponding to the first type and the second type, respectively; and performing multiplication computation on the input feature map and the first mask to generate the first output feature map, and performing multiplication computation on the input feature map and the second mask to generate the second output feature map.

4. The audio processing method of claim 1, wherein utilizing the first deconvolution layer circuit and the second deconvolution layer circuit to perform deconvolution processing on different portions of the first output feature map, respectively, to generate corresponding processing results, for generating the first audio output signal further comprises:

utilizing the first deconvolution layer circuit to perform deconvolution processing corresponding to the first length on a first partial feature map of the first output feature map, for generating a set of first intermediate samples corresponding to the first partial feature map of the first output feature map; and utilizing the second deconvolution layer circuit to perform deconvolution processing corresponding to the second length on a second partial feature map of the first output feature map, for generating a set of second intermediate samples corresponding to the second partial feature map of the first output feature map.

5. The audio processing method of claim 4, wherein utilizing the first deconvolution layer circuit and the second deconvolution layer circuit to perform deconvolution processing on different portions of the first output feature map, respectively, in order to generate corresponding processing results, for generating the first audio output signal further comprises:

performing addition computation on the set of first intermediate samples of the first partial feature map of the first output feature map and the set of second intermediate samples of the second partial feature map of the first output feature map, respectively, to generate a set of addition computation results as multiple samples of the first audio output signal.

6. The audio processing method of claim 1, wherein utilizing the first deconvolution layer circuit and the second deconvolution layer circuit to perform deconvolution processing on different portions of the second output feature map, respectively, in order to generate corresponding processing results, for generating the second audio output signal further comprises:

utilizing the first deconvolution layer circuit to perform deconvolution processing corresponding to the first length on a first partial feature map of the second output feature map, for generating a set of first intermediate samples corresponding to the first partial feature map of the second output feature map; and utilizing the second deconvolution layer circuit to perform deconvolution processing corresponding to the second length on a second partial feature map of the second output feature map, for generating a set of second intermediate samples corresponding to the second partial feature map of the second output feature map.

7. The audio processing method of claim 6, wherein utilizing the first deconvolution layer circuit and the second deconvolution layer circuit to perform deconvolution processing on different portions of the second output feature map, respectively, in order to generate corresponding processing results, for generating the second audio output signal further comprises:

performing addition computation on the set of first intermediate samples of the first partial feature map of the second output feature map and the set of second intermediate samples of the second partial feature map of the second output feature map, respectively, to generate a set of addition computation results as multiple samples of the second audio output signal.

8. An audio processing device, comprising:
an audio signal analyzer, comprising:
a first convolution layer circuit and a second convolution layer circuit, arranged to perform convolution processing on an audio mixture signal, respectively, in order to generate an input feature map, wherein each of the first convolution layer circuit and the second convolution layer circuit comprises multi-layer one-dimensional convolution kernels, and a convolution kernel layer length of the first convolution layer circuit and a convolution kernel layer length of the second convolution layer circuit are equal to a first length and a second length, respectively;

a separator, coupled to the audio signal analyzer, and arranged to perform separation processing corresponding to a predetermined neural network model on the input feature map, to obtain a first output feature map and a second output feature map respectively corresponding to a first type and a second type; and an audio signal synthesizer, coupled to the separator, and comprising:

a first deconvolution layer circuit and a second deconvolution layer circuit, arranged to perform deconvolution processing on different portions of the first output feature map, respectively, in order to generate corresponding processing results, for generating a first audio output signal, and perform deconvolution processing on different portions of the second output feature map, respectively, in order to generate corresponding processing results, for generating a second audio output signal, wherein each of the first deconvolution layer circuit and the second deconvolution layer circuit comprises multi-layer one-dimensional convolution kernels, and a convolution kernel layer length of the first deconvolution layer circuit and a convolution kernel layer length of the second deconvolution layer circuit are equal to the first length and the second length, respectively.

9. The audio processing device of claim 8, wherein the first convolution layer circuit comprises a set of one-dimensional convolution layers, each having the first length, for acting as the multi-layer one-dimensional convolution kernels in the first convolution layer circuit, and the first deconvolution layer circuit comprises a set of one-dimensional deconvolution layers, each having the first length, for acting as the multi-layer one-dimensional convolution kernels in the first deconvolution layer circuit; and the second convolution layer circuit comprises a set of one-dimensional convolution layers, each having the second length, for acting as the multi-layer one-dimensional convolution kernels in the second convolution layer circuit, and the second deconvolution layer circuit comprises a set of one-dimensional deconvolution layers, each having the second length, for acting as the multi-layer one-dimensional convolution kernels in the second deconvolution layer circuit.

10. A non-transitory computer-readable medium, wherein the non-transitory computer-readable medium stores computer-readable instruction code so that an audio processing device performs an audio processing procedure when executing the computer-readable instruction code, and the audio processing procedure comprises:

utilizing a first convolution layer circuit and a second convolution layer circuit to perform convolution processing on an audio mixture signal, respectively, in order to generate an input feature map, wherein each of the first convolution layer circuit and the second convolution layer circuit comprises multi-layer one-dimensional convolution kernels, and a convolution kernel layer length of the first convolution layer circuit and a convolution kernel layer length of the second convolution layer circuit are equal to a first length and a second length, respectively;

performing separation processing corresponding to a predetermined neural network model on the input feature map, to obtain a first output feature map and a second output feature map respectively corresponding to a first type and a second type; and utilizing a first deconvolution layer circuit and a second deconvolution layer circuit to perform deconvolution processing on different portions of the first output feature map, respectively, in order to generate corresponding processing results, for generating a first audio output signal, and utilizing the first deconvolution layer circuit and the second deconvolution layer circuit to perform deconvolution processing on different portions of the second output feature map, respectively, in order to generate corresponding processing results, for generating a second audio output signal, wherein each of the first deconvolution layer circuit and the second deconvolution layer circuit comprises multi-layer one-dimensional convolution kernels, and a convolution kernel layer length of the first deconvolution layer circuit and a convolution kernel layer length of the second deconvolution layer circuit are equal to the first length and the second length, respectively.

* * * * *